United States Patent [19]
Myers

[11] Patent Number: 5,140,510
[45] Date of Patent: Aug. 18, 1992

[54] CONSTANT FREQUENCY POWER CONVERTER

[75] Inventor: Ronald G. Myers, Scottsdale, Ariz.

[73] Assignee: Motorola, Inc., Schaumburg, Ill.

[21] Appl. No.: 663,484

[22] Filed: Mar. 4, 1991

[51] Int. Cl.$^5$ ............................................. H02M 3/335
[52] U.S. Cl. ........................................ 363/20; 363/98; 363/132
[58] Field of Search ........................ 363/20, 21, 24, 25, 363/26, 58, 97, 98, 131, 132

[56] References Cited

U.S. PATENT DOCUMENTS

| | | | |
|---|---|---|---|
| 4,679,129 | 7/1987 | Sakakibara et al. | 363/98 X |
| 4,691,273 | 9/1987 | Kuwata et al. | 363/98 X |
| 4,845,605 | 7/1989 | Steigerwald | 363/97 X |
| 4,858,099 | 8/1989 | McMillan et al. | 363/97 |
| 4,992,919 | 2/1991 | Lee et al. | 363/98 X |

OTHER PUBLICATIONS

"Constant-Frequency Zero-Voltage-Switched Multi--Resonant Converters:Analysis, Design, and Experimental Results", Farrington et al, IEEE 1990, pp. 197–205.

"Development of a Multiple Output Resonant Converter for Space Applications", Temkin et al, IEEE 1988, pp. 167–181.

"Resonant Converter Controlled by Variable Capacitance Devices", Harada et al; IEEE 1990, pp. 273–280.

Primary Examiner—Emanuel T. Voeltz
Attorney, Agent, or Firm—Frank J. Bogacz

[57] ABSTRACT

A constant frequency power converter which includes a system to switch a resonant capacitive or inductive element during the power transfer cycle in a clamped series resonant converter. A feedback control system generates a pulse width modulated signal to switch the resonant element at the appropriate time. A conventional power MOSFET can be used as the switching device. The resonant control elements may be operated in series or parallel depending on the basic resonant topology selected. Applications include high frequency power converters where small size is of prime concern.

18 Claims, 2 Drawing Sheets

CONSTANT FREQUENCY POWER CONVERTER

BACKGROUND OF THE INVENTION

This invention relates in general to the field of power converters, and, more particularly, to diode-clamped series resonant power converters.

In conventional pulse width modulated (PWM) power converters, switching losses increase as frequency increases. Efficiency therefore decreases as the frequency increases and the benefits of smaller components cannot be fully realized.

Resonant power converters process power in sinusoidal waveforms and switching losses can be reduced by zero current switching (ZCS) or zero voltage switching (ZVS). Either approach, however, is associated with the disadvantages of high peak currents or voltages and wide frequency range for control.

The diode-clamped series resonant converter has been proposed to reduce the problem of high component stresses, but does not address the problems associated with frequency control. As an example, consider a clamped series resonant converter (CSRC). For design parameters of input voltage range of 22 to 50 Volts DC (VDC), output voltage of 5 VDC, output current of 3 Amperes (A) and output power of 15 Watts (W), the peak currents may vary from approximately 4 A to more than 15 A, and the corresponding resonant frequencies of the power converter range from about 600 (kHz) to almost 97 kHz. If the output power decreases from 15 W, the switching frequency must decrease to maintain constant output voltage.

Thus, even with zero current switching in the diode-clamped series resonant converter, the advantage of the resonant converter for high frequency operation due to the reduction of switching losses largely disappears due to the frequency control problem. Filter components and transformers must be large enough to accommodate the lowest switching frequency. In addition, as in the above example, the still relatively high peak current gives rise to large component stresses. Two other disadvantages of the CSRC converter are: 1) electromagnetic interference is generated at the low frequencies required to maintain regulation; and, 2) the output filter capacitor must be large to maintain low output voltage ripple.

A constant frequency resonant power converter significantly reduces the above disadvantages. Several complex schemes have been proposed for achieving a resonant power converter capable of constant frequency operation. One scheme involves the use of interconnected multi-resonant converters. Multi-resonant converters involve at least two resonant converters in a complex interconnection employing active switching. Additional switches or more complex switching arrangements are required for the multi-resonant converters than for the constant frequency CSRC: e.g., for a half-bridge configuration either two additional switches on the secondary side, one additional switch on the secondary side, or one bidirectional switch on the primary side of the transformer are required.

Another proposed method for achieving a constant frequency resonant power converter uses a variable capacitance device in the output filter of a converter to reduce the output ripple voltage. The variable capacitance device requires an independent control voltage to vary the capacitance, however, and in such an arrangement it is preferable that the capacitance not be under the influence of the input source voltage.

Neither multi-resonant converters nor variable capacitance converters employ the switching of a resonant capacitive or inductive element during the power transfer cycle in the manner advocated here. The present method uses a feedback control system to generate a pulse-width modulated signal to switch the resonant capacitive or inductive element at the appropriate time.

It is highly desirable to provide for a resonant power converter capable of constant frequency operation with ZCS or ZVS while reducing peak current and voltage. It is particularly desirable to provide for the use of smaller magnetic devices and smaller filter capacitors than with variable frequency power converters, in a constant frequency power converter exhibiting reduced electromagnetic interference.

SUMMARY OF THE INVENTION

Accordingly, it is an advantage of the present invention to provide a new and improved apparatus for control of output voltage in providing constant frequency operation with zero current and zero voltage switching in a resonant power converter. It is a further advantage of the present invention to provide a method to provide for the use of smaller magnetic devices and smaller filter capacitors than with conventional variable frequency resonant power converters. It is still a further advantage of the present invention to provide a constant frequency power converter exhibiting reduced electromagnetic interference over conventional power converters.

To achieve these advantages, a constant frequency power converter is contemplated which includes a system to switch a resonant capacitive or inductive element during the power transfer cycle in a clamped series resonant converter. A feedback control system generates a pulse width modulated signal to switch the resonant element at the appropriate time. A conventional power MOSFET can be used as the switching device. The resonant control elements may be operated in series or parallel depending on the basic resonant topology selected. Applications include high frequency power converters where small size is of prime concern.

The above and other features and advantages of the present invention will be better understood from the following detailed description taken in conjunction with the accompanying drawings.

BRIEF DESCRIPTION OF THE DRAWINGS

FIG. 3 there is shown a circuit schematic of an alternate embodiment in accordance with the invention.

DETAILED DESCRIPTION OF THE PREFERRED EMBODIMENT

Figure 1:
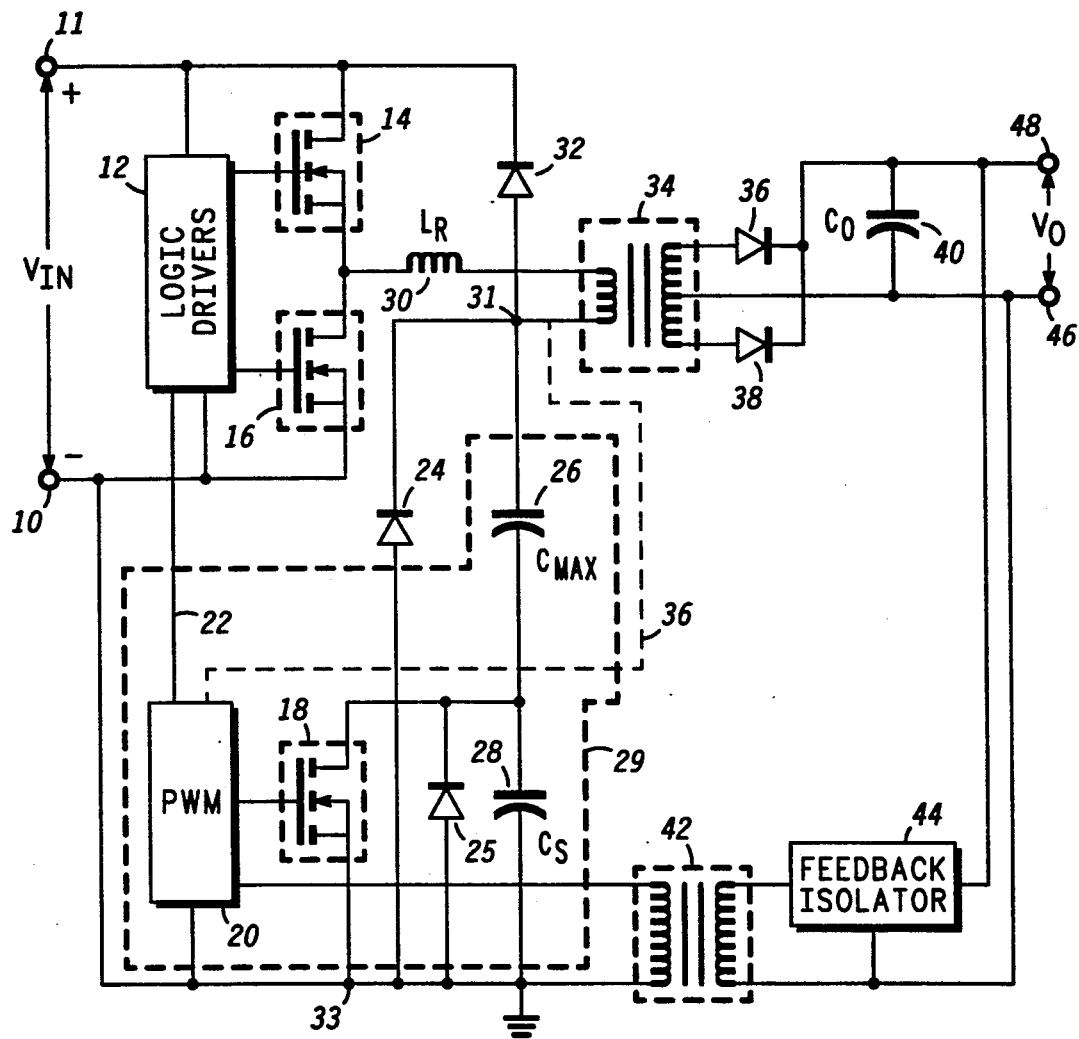
In FIG. 1, there is shown a circuit schematic of a preferred embodiment in accordance with the invention implemented in a CSRC configuration.

In FIG. 1, there is shown a circuit schematic of a feedback control loop system 29 and CSRC configuration in accordance with the preferred embodiment of the invention.

A basic CSRC configuration has been described by D. Temkin in "Development of a Multiple Output Resonant Converter for Space Applications," IEEE Applied Power Electronics Conference, 1988 Record, pp.

167–176 (IEEE Publication 88CH-2504-9). The preferred embodiment of the invention, however, uses a variation of the basic CSRC as shown in addition to the components indicated in FIG. 1 within the feedback control loop system 29, and the optional current feedback element 36, as described below.

The preferred embodiment of the invention includes a CSRC configuration with the following: input terminals 10 and 11 connected to the logic drivers 12; two switching transistors 14 and 16 connected to each other and coupled to the logic drivers 12; switching transistor 14 additionally coupled to input terminal 11, diode 32, and inductive element 30; switching transistor 16 additionally coupled to input terminal 10 and inductive element 30; inductive element 30 coupled through transformer element 34 to terminal point 31; the output side of transformer element 34 with center-tapped output connected to output terminal 46; the transformer element 34 second output connected through diode 36 to output terminal 48; the transformer element 34 third output connected through diode 38 to output terminal 48; capacitive element 40 connected between the transformer element 34 center-tapped output 46 and output terminal 48; feedback isolator 44 connected between the transformer element 34 center-tapped output 46 and output terminal 48 as well as coupled to transformer element 42.

The feedback control loop system 29 includes: PWM signal generator 20, with clock output 22 connected to the logic drivers 12; switching transistor 18 connected to the PWM signal generator 20, terminal point 33 (ground), capacitive element 26, capacitive element 28, and diode element 25; diode element 24 is connected between terminal point 31 and terminal point 33; diode element 25 is connected between switching transistor 18 and terminal point 33; capacitive element 28 is connected between switching transistor 18 and terminal point 33; and capacitive element 26 is connected between capacitive element 28 and terminal point 31. Terminal point 33 is connected to input terminal 10. Transformer element 42 is coupled to terminal point 33 and the PWM signal genrator 20. Diode 24 is connected between terminal points 31 and 33.

While the preferred embodiment of the invention in FIG. 1 shows capacitive element 26 in series with capacitive element 28, with a connection from switching transistor 18 between the capacitive elements, a parallel connection of capacitive elements 28 and 26 or even inductive elements can also be used. As shown in FIG. 3, suitable parallel arrangement starts with the series combination of switching transistor 18 and capacitive element 28. The series combination is configured in parallel with capacitive element 26, with the complete combination connected between terminal points 31 and 33 to form a parallel version.

The basic operating principle of the constant frequency clamped series resonant converter (CFCSRC) is to maintain one capacitive element in a resonant circuit with an inductor and to switch one capacitive element in and out of the resonant loop, as required, resulting in two possible resonant frequencies. Switching transistor 18 is capable of switching capacitive element 28 in and out of the resonant circuit containing inductive element 30 and capacitive element 26. Thus, if the value of capacitive element 26 is $C_{max}$ and the value of capacitive element 28 is $C_s$, the effective capacitance, $C_{eq}$ between terminal points 21 and 33 can be either $C_{max}$ or the lesser value $(1/C_s + 1/C_{max})^{-1}$.

Figure 2:
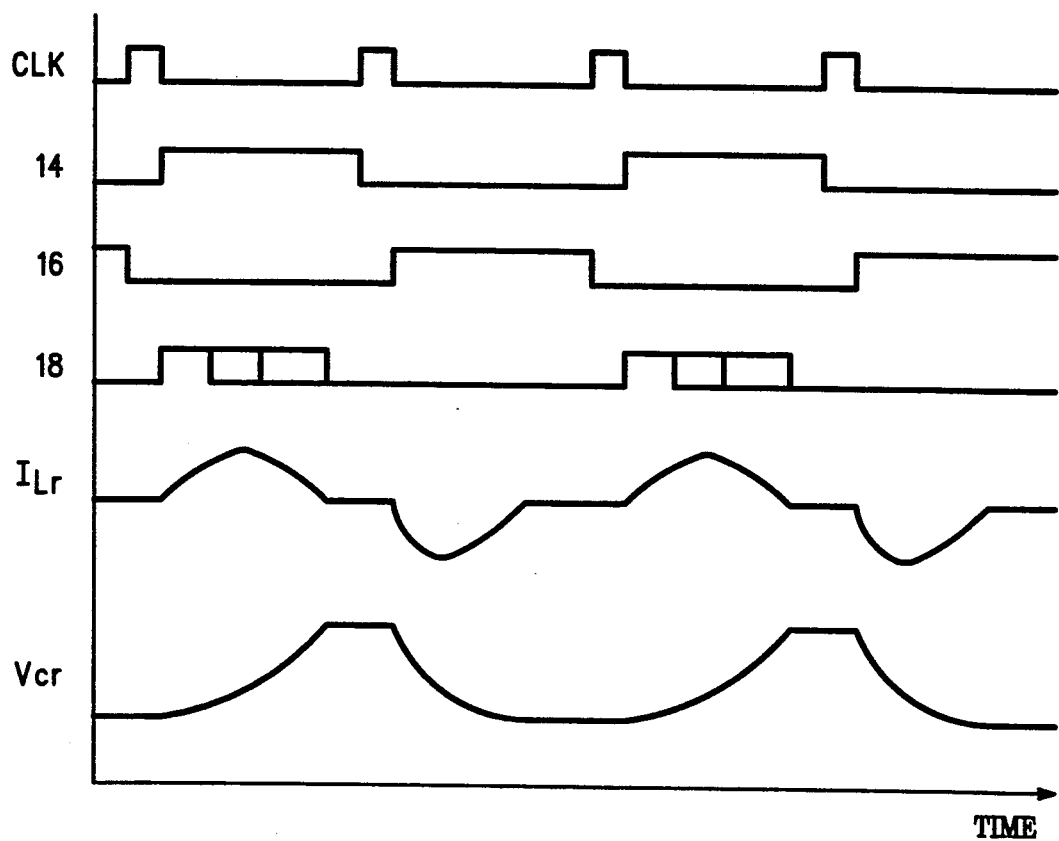
In FIG. 2, there is shown a diagram of the signal waveforms versus time that are exhibited by various components in the circuit schematic in FIG. 1.

As shown by the waveforms in FIG. 2, the typical switching cycle starts with switching transistors 14 and 18 on, and switching transistor 16 off. Corresponding inductive element 30 current is shown as $I_L$, and the sum of the voltage across capacitive elements 26 and 28 (i.e., the potential difference between terminal points 31 and 33) is shown as $V_{Cr}$. Since switching transistor 18 is on, capacitive element 28 is out of the circuit, and the current through the inductive element 30 as a function of time, $i_L(t)$, increases sinusoidally with resonant frequency $\omega_o$, determined by inductive element 30 and capacitive element 26. At time $t_1$, switching transistor 18 is turned off, creating the equivalent capacitance $C_{eq}$. Control is achieved by variation of the delay time $t_1$. As a result, $i_L(t)$ continues to vary sinusoidally, but with frequency $\omega_1$, determined by inductive element 30 and the equivalent capacitance, $C_{eq}$. When the sum of the voltage across capacitive elements 26 and 28, $V_{Cr}$, increases to the potential difference across input terminals 10 and 11, i.e. $V_{in}$ in FIG. 1, diode 32 turns on, preventing a further rise in $V_{Cr}(t)$ regardless of operating point, and $i_L(t)$ decreases linearly to zero.

Nothing further happens until switching transistor 14 turns off and switching transistor 16 turns on. At that point, the stored charge on the equivalent capacitance $C_{eq}$ causes $i_L(t)$ to decrease sinusoidally at frequency $\omega_1$ until all charge is removed from capacitive element 28. Diode 25 then clamps $V_{Cmax}$ to zero, and $i_L(t)$ begins to change at frequency $\omega_o$. When $V_{Cr}$ decreases to zero, diode 24 turns on and clamps $V_{Cr}$ at zero, and $i_L(t)$ ramps upward linearly to zero, where it remains until the beginning of the next switching cycle. All associated waveforms are shown in FIG. 2.

One may observe the following benefits from operating the CFCSRC in the manner described. First, control is achieved through varying time $t_1$, not by varying the switching frequency. Typical resonant converters must work over a frequency range of more than an octave, meaning that transformers and filter components must be large enough to function effectively at the lowest frequency of operation. In the CFCSRC, such components may be optimized for one frequency. Second, the change in the resonant capacitor at time $t_1$ results in reduced peak inductor current for a large range of $t_1$. Third, the clamping action of diode 32 insures that the voltage on the capacitors will remain less than the input voltage $V_{in}$, regardless of the operating point. This permits the use of smaller, higher-Q resonant capacitors, e.g., multilayer ceramic chip capacitors. Finally, the clamping action of diode 32 and diode 24 forces the inductor current to zero, resulting in ZCS on switching transistors 14 and 16 and the clamping action of diode 25 results in zero voltage switching on switching transistor 18. The zero current and zero voltage switching result in reduced switching losses.

A constant frequency power converter has been described which overcomes specific problems and accomplishes certain advantages relative to prior art methods and mechanisms. The improvements over known technology are significant. The advantage of resonant converters use for high frequency operation due to the reduction of switching losses is improved because of constant frequency operation. Smaller filter capacitors and magnetic devices are possible because a low frequency does not need to be accommodated. The constant frequency operation also means that filter components and transformers can be optimized for the constant operating frequency. In addition, reduced peak current and voltage reduce component stresses. Electromagnetic interference is reduced because low frequencies are not generated to maintain regulation.

Thus, there has also been provided, in accordance with an embodiment of the invention, a constant frequency power converter that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

I claim:

1. A constant frequency power converter comprising:
   first and second signal inputs;
   first and second signal outputs;
   a clamped series resonant converter (CSRC) connected separately to both the first and second signal inputs and both the first and second signal outputs;
   feedback control loop means coupled to the CSRC; and
   feedback isolator means coupled separately to the first and second signal outputs and to the feedback control loop means.

2. A constant frequency power converter as claimed in claim 1 wherein the feedback control loop means comprises:
   first and second capacitive means coupled together in a first series combination forming a first terminal connection between them;
   first clamping means coupled in parallel to the first series combination of the first and second capacitive means;
   second clamping means coupled in parallel to the second capacitive means; and
   switching means coupled to the first terminal connection, the feedback isolator means, and the CSRC.

3. A constant frequency power converter as claimed in claim 2 wherein the switching means comprises:
   pulse width modulation means connected to the CSRC, to the second signal input, and also to the feedback isolator means; and
   a switch of three switch connections wherein the first switch connection is coupled to the first terminal connection, and the second switch connection and the third switch connection are coupled together and also coupled to the feedback isolator means and the second signal input.

4. A constant frequency power converter as claimed in claim 3 wherein the switch is a power metal oxide semiconductor field effect transistor (MOSFET).

5. A constant frequency power converter as claimed in claim 1 wherein the feedback control loop means comprises:
   switching means coupled to the feedback isolation means and the CSRC;
   first capacitive means coupled in series to the switching means to form a second series combination;
   second capacitive means coupled in parallel with the second series combination;
   first clamping means coupled in parallel to the first capacitive means; and
   second clamping means coupled in parallel to the second capacitive means.

6. A constant frequency power converter as claimed in claim 5 wherein the switching means comprises:
   pulse width modulator means connected to the CSRC, to the second signal input, and also to the feedback isolator; and
   a switch of three switch connections wherein the first switch connection is coupled to the first terminal connection, and the second switch connection and the third switch connection are coupled together and also coupled to the feedback isolator means and the second signal input.

7. A constant frequency power converter as claimed in claim 6 wherein the switch is a power metal oxide semiconductor field effect transistor (MOSFET).

8. A constant frequency power converter as claimed in claim 3 wherein the switching means further comprises current feedback means coupled between the pulse width modulation means and the CSRC.

9. A method for the conversion of power at a constant frequency, comprised of the steps of:
   providing an input signal to first and second input terminals of a clamped series resonant converter (CSRC);
   increasing current in the CSRC resonant at a first resonant frequency;
   controlling the switching of at least one reactive element into the CSRC resonant circuit to provide a new resonant frequency for the CSRC;
   manipulating voltages across the at least one reactive element of the CSRC resonant circuit;
   eliminating the current in the CSRC resonant circuit; and
   outputting a constant frequency signal from the CSRC.

10. A method for the conversion of power at a constant frequency as claimed in claim 9, the method further comprising the step of repeating the steps of:
    providing an input signal to first and second input terminals of a clamped series resonant converter (CSRC);
    increasing current in the CSRC resonant at a first resonant frequency;
    controlling the switching of at least one reactive element into the CSRC resonant circuit to provide a new resonant frequency for the CSRC;
    manipulating voltages across the at least one reactive element of the CSRC resonant circuit;
    eliminating the current in the CSRC resonant circuit; and
    outputting a constant frequency signal from the CSRC.

11. A method for the conversion of power at a constant frequency as claimed in claim 9 wherein the step of manipulating the voltages across the at least one reactive element of the CSRC resonant circuit comprises the steps of:
    clamping the voltages across a plurality of capacitive elements in the resonant circuit; and
    removing charge from the plurality of capacitive elements in the resonant circuit.

12. A method for the conversion of power at a constant frequency as claimed in claim 11, wherein the step of controlling the switching of a reactive element into the CSRC resonant circuit to provide a new resonant frequency comprises the steps of:
    feeding back output of the CSRC as input to a pulse width modulator (PWM); and
    providing PWM output to the CSRC and to a switch.

13. A feedback loop control system for use with a clamped series resonant converter (CSRC) at constant frequency, comprising:
- a pulse width modulator (PWM) coupled to the CSRC;
- switching means coupled to the PWM;
- a plurality of reactive means coupled to the CSRC and the switching means; and
- the switching means coupled to at least one of the reactive means.

14. A feedback loop control system as claimed in claim 13 wherein the PWM and the switching means are each coupled to a feedback isolator.

15. A feedback loop control system as claimed in claim 14 wherein the plurality of reactive means comprises:
- first capacitive means;
- second capacitive means coupled in parallel with the switching means forming a parallel combination; and
- the first capacitive means and the parallel combination coupled in series forming a series combination.

16. A feedback loop control system as claimed in claim 15 wherein the feedback loop control system further comprises:
- first clamping means coupled in parallel to the series combination; and
- second clamping means coupled in parallel to the second capacitive means.

17. A feedback loop control system as claimed in claim 15 wherein the switching means further comprises a switch of three switch connections wherein:
- the first switch connection is coupled to the first capacitive means; and
- the second switch connection and the third switch connection are coupled together and to the feedback isolator.

18. A feedback loop control system as claimed in claim 16 wherein the switching means includes a power metal oxide semiconductor field effect transistor (MOSFET).

* * * * *